Figures 1, 2:
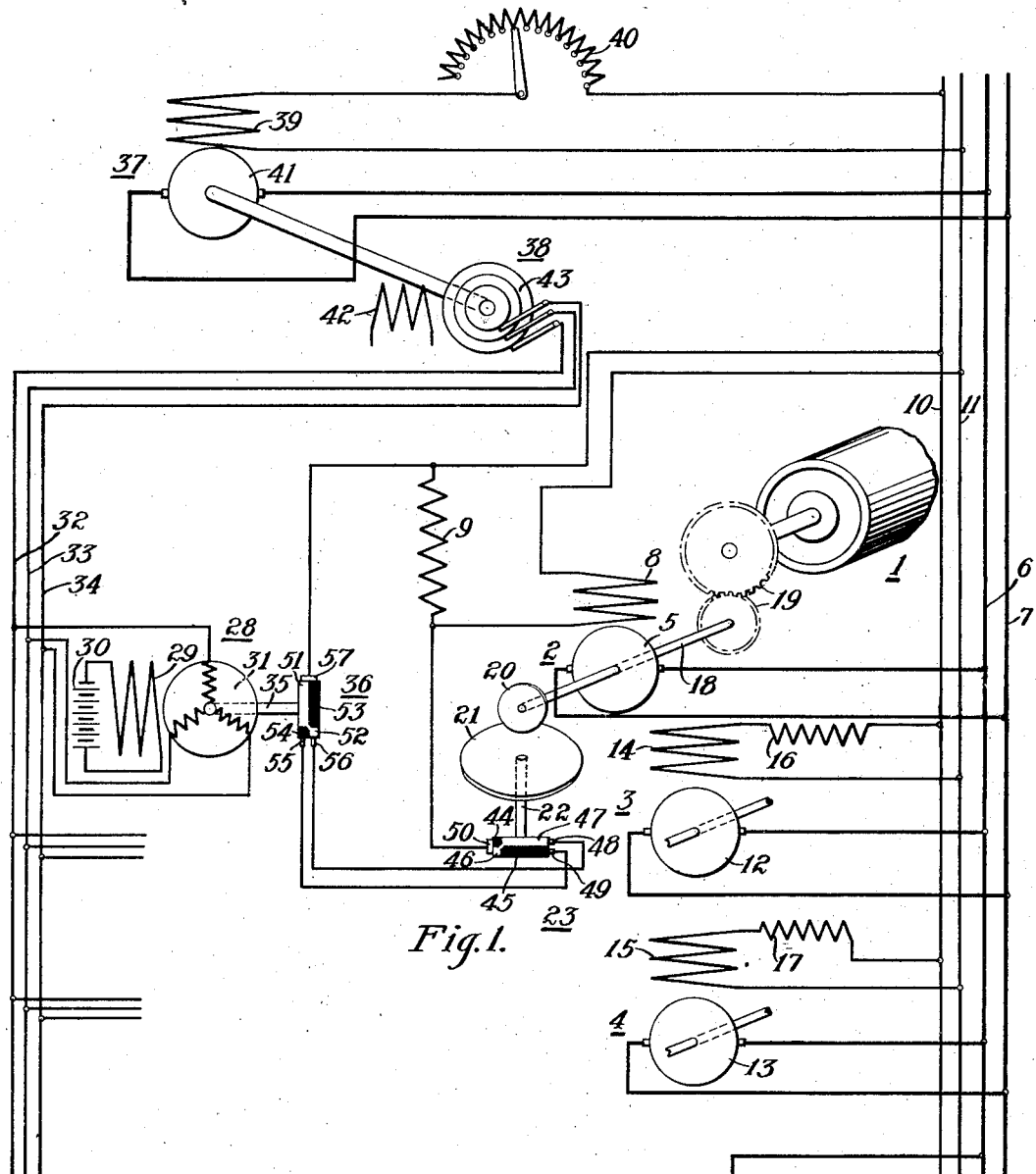

Nov. 10, 1925.

W. E. MENZIES 1,561,265

SPEED REGULATOR SYSTEM

Filed Jan. 12, 1920

WITNESSES:
H. T. Shelhamer
W. B. Wells

INVENTOR
William E. Menzies
BY
Wesley G. Carr
ATTORNEY

Patented Nov. 10, 1925.

1,561,265

UNITED STATES PATENT OFFICE.

WILLIAM E. MENZIES, OF IRWIN, PENNSYLVANIA, ASSIGNOR TO WESTINGHOUSE ELECTRIC & MANUFACTURING COMPANY, A CORPORATION OF PENNSYLVANIA.

SPEED-REGULATOR SYSTEM.

Application filed January 12, 1920. Serial No. 350,734.

*To all whom it may concern:*

Be it known that I, WILLIAM E. MENZIES, a citizen of the United States, and a resident of Irwin, in the county of Westmoreland and State of Pennsylvania, have invented a new and useful Improvement in Speed-Regulator Systems, of which the following is a specification.

My invention relates to regulator systems and particularly to regulator systems for controlling the speeds of rotating members.

One object of my invention is to provide a regulator system that shall govern the speeds of a number of motors and that shall maintain a constant speed ratio between the motors.

In many manufacturing establishments, it is essential to operate a number of rotating members at a constant speed or to maintain a constant speed ratio, variable at will, between a number of moving parts. Thus, in a paper mill, it is necessary that the speed ratio between the various sets of paper rolls be maintained constant in order to prevent breaking of the paper which is passing between the rolls.

In a regulator system constructed in accordance with my invention and applied to a paper mill, each set of paper rolls is individually motor driven and the various motors are so controlled as to maintain a constant speed ratio between them.

In one method of practicing my invention, each set of rolls is operated by a main motor, preferably a direct-current motor, and a commutator is operated by each main motor in accordance with the speed of the associated rolls. A synchronous motor is associated with each main motor and a commutator is controlled by each of said synchronous motors. The field-magnet winding circuits of the main motors are provided with resistors which are selectively short-circuited by said commutators to maintain a constant speed ratio between the main motors.

In the accompanying drawing, Figure 1 is a diagrammatic view of a regulator system embodying my invention, and Fig. 2 is a diagrammatic view of the commutator devices shown in Fig. 1.

Referring to the accompanying drawing, a paper mill is provided with a plurality of sets of rolls, one roll only of one set being shown on the drawing. A roll 1 is operated by a direct-current motor 2, and two other motors 3 and 4 are provided for rotating other roll units (not shown). The motor 2 comprises an armature 5, which is connected across the supply circuit comprising conductors 6 and 7, and a field-magnet winding 8 which is connected, through a resistor 9, across an auxiliary supply circuit comprising conductors 10 and 11. The motors 3 and 4 respectively comprise armatures 12 and 13 which are connected across the supply conductors 6 and 7, and field-magnet windings 14 and 15 which are connected, through resistors 16 and 17, across the supply conductors 10 and 11.

The armature shaft 18 of the motor 2 is geared to the roll 1 in any suitable manner, as by means of gear wheels 19. The shaft 18 is further provided with a friction wheel 20 which engages a friction disk 21. The friction disk 21 is mounted on a shaft 22 which also supports a commutator device 23. Thus, the commutator device 23 is rotated in accordance with the speed of the motor 2, and the friction wheel 20 is moved, relative to the friction disk 21, to maintain any desired ratio of speed between the motor 2 and the commutator device 23. Any suitable means may be provided for varying the position of the friction wheel relative to the friction disk. Obviously, any other speed-changing device may be provided, such as cone pulleys. The motors 3 and 4 operate rolls and commutator devices in the same manner as that shown in connection with the motor 2 and, inasmuch as these motors operate in the same manner as the motor 2, it is deemed unnecessary to completely illustrate and describe the parts operated by the motors 3 and 4.

A direct-current generator 24, comprising an armature 25 and a field-magnet winding 26, is connected to the supply circuit comprising conductors 6 and 7. A rheostat 27 is connected in circuit with the field-magnet winding 26 for varying the excitation of the generator to control the voltage which is impressed upon the conductors 6 and 7. Thus, by varying the excitation of the generator 24, the speed of the motors 2, 3 and 4 may be varied without changing the speed ratio between such motors. A synchronous motor is associated with each of the motors 2, 3 and 4, one only of which, 28, is illustrated on the drawing.

The synchronous motor 28 comprises a field-magnet winding 29, which is connected to any suitable source of current 30, and a rotor 31 which is connected to a three-phase supply circuit comprising conductors 32, 33 and 34. The rotor 31 is connected by a shaft 35 to a commutator device 36.

A motor-generator set, comprising a direct-current motor 37 and an alternating-current generator 38, is provided for supplying energy to the synchronous motors. The motor 37 comprises a field-magnet winding 39, which is connected through a rheostat 40 to the supply conductors 10 and 11, and an armature 41 which is connected across the supply conductors 6 and 7. The generator 38 comprises a field-magnet winding 42 and an armature 43 which is connected to the supply circuit comprising conductors 32, 33 and 34.

The commutator device 23 comprises two insulating segments 44 and 45, which extend 180° around the device, and two conducting segments 46 and 47 which are electrically connected and which are disposed adjacent to the segments 44 and 45. Brushes 48 and 49 are provided which respectively engage the segments 44 and 47 and segments 46 and 45, and a third brush 50 is provided which is disposed 180° from the brushes 48 and 49. The brush 50 is of such width as to engage all segments during the rotation of the commutator device.

The commutator device 36 comprises two conducting segments 51 and 52 and two insulating segments 53 and 54 which are disposed adjacent to the conducting segments 51 and 52. Each of the conducting segments and insulating segments extends 180° around the commutator device. A brush 55 engages the segments 51 and 54, a brush 56 engages the segments 52 and 53 and a brush 57 engages all commutator segments. The brush 49 of the commutator device 23 is directly connected to the brush 55 of the commutator segment 36, and the brush 48 is directly connected to the brush 56 as illustrated in Fig. 2 of the drawing. Brushes 50 and 57 are respectively connected to opposite terminals of the resistor 9.

When the system is in operation, each of the main motors 2, 3 and 4 operates a roll similar to the roll 1 associated with the motor 2 and the relative speeds of these rolls is maintained constant by means of commutator devices two only of which, 36 and 23 that are associated with the roll 1, are illustrated upon the drawing. The friction wheel 20, the friction disk 21 and the synchronous motor 28 are so adjusted that the commutator devices 36 and 23 are rotated synchronously under normal operating conditions. When the two commutator devices 23 and 36 are rotating synchronously, two circuits are alternately completed through the two commutator devices for short-circuiting the resistor 9. The first circuit extends from one terminal of the resistor 9, through the brush 50, contact segments 47 and 46, brushes 49 and 55, commutator segments 51 and 52, and the brush 57, to the other terminal of the resistor 9. The second circuit for short-circuiting the resistor extends from one terminal of the resistor 9, through the brush 50, contact segments 46 and 47, brushes 48 and 56, commutator segments 52 and 51, and the brush 57, to the other terminal of the resistor 9.

In case the speed of the commutator device 23 varies relative to the speed of the commutator device 36, the proportion of time the brushes 48 and 56, 49 and 55, and 50 and 57 short-circuit the resistor 9 is correspondingly varied. Thus, during a portion of the time, the brush 48 will be on the insulating segment 44 when the brush 56 is on the conducting segment 52 and, vice versa, the brush 56 will be in engagement with the insulating segment 53 when the brush 48 is in engagement with the conducting segment 47. Moreover, the brush 49 will be in engagement with the insulating segment 45 during a portion of the time that the brush 55 is in engagement with the conducting segment 51, and the brush 55 will be in engagement with the insulating segment 54 during a portion of the time that the brush 49 is in engagement with the conducting segment 46.

If the two commutator devices have been displaced 180° relative to each other, it is apparent that the brush 48 will be in engagement with the insulating segment 44 when the brush 56 is in engagement with the conducting segment 52, and the brush 49 will be in engagement with the insulating segment 45 when the brush 55 is in engagement with the conducting segment 51. Thus, the short-circuit is completely removed from the resistor 9. Between such extreme positions, when the two commutator devices are rotating synchronously and when the two devices are moved 180° relative to each other, it is apparent that the intervals of time during which the resistor 9 is short-circuited may be varied in accordance with the speed of the motor 2.

In the commutator devices illustrated in the drawing, the various segments extend 180° around the device and the brushes 50 and 57 are disposed 180° from the brushes 48, 49, 55 and 56 but, if closer regulation is desired, the number of segments may be increased and the brushes moved closer together in accordance therewith. Thus, if the commutator segments were doubled in number and extended only 90° around the commutator device, the brushes 50 and 57 would be located only 90° away from the brushes 48, 49, 55 and 56. Moreover, if so desired, the synchronous motors, which are associated with the main motor for operating the commutator devices, may be replaced by a rotating shaft.

The commutator devices, which are associated with the motors 3 and 4, operate in a manner similar to that of the commutator devices 23 and 36 and, inasmuch as the synchronous motors operate at the same speeds, it is apparent that the commutator devices will maintain the speed ratio between the motors 2, 3 and 4 substantially constant. If it is desired to change the speed of all the motors 2, 3 and 4 simultaneously, the rheostat 27 is varied to control the voltage which is impressed upon the supply conductors 6 and 7. The voltage on the supply circuit comprising conductors 6 and 7 in turn determines the speed of the motors 2, 3 and 4.

Adjustments for operating the propelling motors 2, 3 and 4 at variable relative speeds that may be maintained substantially constant, may be made by means of the speed-changing devices operated by the propelling motors.

Other modifications in the system and in the arrangement and location of parts may be made within the spirit and scope of my invention, and such modifications are intended to be covered by the appended claims.

I claim as my invention:

1. In a regulator system, the combination comprising a plurality of rolls, a motor for operating each of said rolls, each of said motors having a resistor in circuit therewith, a commutator device operated by each of said motors, and a second commutator device associated with each motor, said commutator devices controlling a shunt circuit for said resistor, and means for varying the time intervals during which said resistor is included in said circuit to maintain a constant speed ratio between the motors.

2. In a regulator system, the combination comprising a plurality of main motors, a plurality of synchronous motors, a common source of alternating current for energizing said synchronous motors, a resistor in the field-magnet winding circuit of each of said main motors, means jointly controlled by the main and the synchronous motors for selectively short-circuiting said resistors to maintain a constant speed ratio between the main motors, and means for simultaneously varying the speed of all main motors without varying the speed ratio between the motors.

3. In a regulator system, the combination with a plurality of main motors, a synchronous motor associated with each of said main motors, and a common source of power for energizing said synchronous motors, of a commutator device operated by each of said main and synchronous motors, resistors in the field-magnet winding circuits of said main motors and controlled by said commutator devices for maintaining a constant speed ratio between the main motors.

4. In a regulator system, the combination comprising a plurality of main motors, a synchronous motor associated with each of said main motors, a common source of power for energizing said synchronous motors, a resistor in the field-magnet winding circuit of each of said main motors, and means jointly controlled by the main and the synchronous motors for selectively short-circuiting said resistors to maintain a constant speed ratio between said main motors.

5. In a regulator system, the combination comprising a plurality of main motors, means for adjusting the operating speed ratio of said motors, a plurality of resistors in circuit therewith, constant-speed means associated with said main motors, and means comprising commutator devices controlled by the main motors and the constant-speed means for controlling the energization of the main motors to maintain a constant-speed ratio between them through the control of the time intervals for including said resistors in said circuits.

6. In a system of motor control, the combination with an electric motor and a separate speed member, of means responsive to speed variation between the motor to be controlled and the speed member for gradually varying the excitation of the controlled motor, said means comprising a resistor and commutators for the separate speed member and the motor to be controlled, said commutators co-operating to intermittently short-circuit said resistor for varying periods of time, and additional means for varying the permanent speed relationship between said motor and said speed member.

7. In a system of motor control, the combination with an electric motor and a separate speed member, of means comprising a resistance associated therewith for gradually varying the excitation of the motor to be controlled, said means comprising commutators for the separate speed member and the motor to be controlled and a resistor connected between said commutators and adapted to be intermittently short-circuited thereby, and additional means for varying the permanent speed relationship between said motor and said speed member.

In testimony whereof, I have hereunto subscribed my name this 30th day of December, 1919.

WILLIAM E. MENZIES.